United States Patent [19]

Bober

[11] 4,009,235
[45] Feb. 22, 1977

[54] METHOD FOR RECLAIMING EXTRUDED PLASTIC RESINS

[75] Inventor: Thomas W. Bober, Rochester, N.Y.

[73] Assignee: Eastman Kodak Company, Rochester, N.Y.

[22] Filed: July 14, 1975

[21] Appl. No.: 595,644

[52] U.S. Cl. .............................. 264/40.2; 264/37; 264/141; 264/151; 264/210 R; 264/285; 425/217; 425/325; 425/391

[51] Int. Cl.² .................. B29C 17/02; B29C 17/14

[58] Field of Search ............. 264/37, 40, 103, 140, 264/141, 151, 210 R, 285, 295, 339, 40.1, 40.2; 425/216, 217, 325, 391; 57/157 R, 157 TA

[56] References Cited

UNITED STATES PATENTS

| 2,545,869 | 3/1951 | Bailey | 264/103 X |
| 2,834,053 | 5/1958 | Bilanin et al. | 264/141 |
| 3,164,947 | 1/1965 | Gaston | 264/DIG. 47 |
| 3,192,293 | 6/1965 | Van Riper | 264/37 |
| 3,492,389 | 1/1970 | Port et al. | 264/147 |
| 3,525,998 | 8/1970 | Chenoweth et al. | 425/217 X |

FOREIGN PATENTS OR APPLICATIONS

| 733,413 | 5/1966 | Canada | 264/140 |
| 41-896 | 7/1966 | Japan | |

*Primary Examiner*—Jan H. Silbaugh
*Attorney, Agent, or Firm*—S. W. Gremban

[57] ABSTRACT

An improved method for reclaiming waste plastic materials generated during an extrusion coating operation. A rotating funnel or other device is used to gather the hot molten plastic waste material and twist it into the shape of a rope. The plastic rope is passed through a cooling bath and one or more pinch rollers. After passing through the rollers, the plastic rope is spooled, chopped, or fed to a plastics processing machine.

11 Claims, 6 Drawing Figures

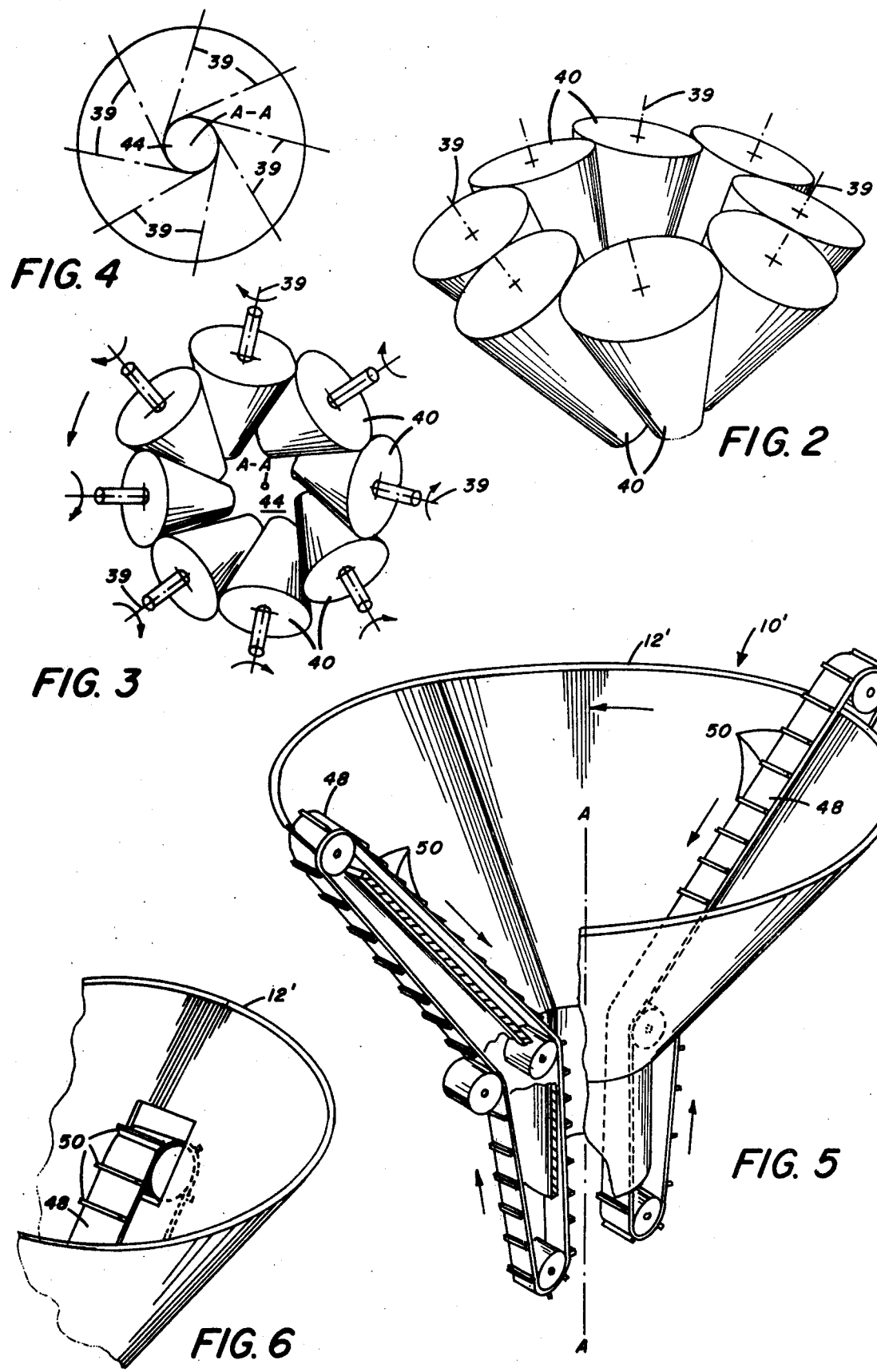

METHOD FOR RECLAIMING EXTRUDED PLASTIC RESINS

BACKGROUND OF THE INVENTION

1. Field of the Invention

The present invention relates to an improved method for reprocessing plastic waste material into a form suitable for reuse in plastic processing machinery, such as, an extruder.

2. Description of the Prior Art

Extrusion operations are known in which a plastic resin, such as polyethylene, is extruded as a free standing structural member of a uniform cross-sectional profile such as plastic tubing or I beams, or is extruded as a curtain on a material such as a web of paper. In such operations, the extruder generates an extrudate of molten waste plastic material or resin of some desired cross sectional form when the extruder is first started and when the extruder is purged. Also, there are times when the apparatus receiving or removing the extrudate is temporarily disabled, but the operation of the extruder must continue to avoid degrading the polymer or resin. All of these operations generate extrudate of some form of water plastic resin that must be collected and disposed of or reused.

One of the methods used by the prior art to handle curtains of waste plastic materials has been to pass them into a trough where they accumulate as an amorphous mass and solidify into a "log" upon cooling. The logs are extremely cubersome, containing up to 400 to 500 pounds of material. They are not readily reprocessable because of their bulk, non-uniformity of shape, non-uniform physical characteristics (for example, no attempt is made to separate clear from pigmented polymers), and because the logs often collect dust, dirt and other impurities. These logs are usually disposed of by being buried or burned, even though their polymer content has value as secondary reclaimed polymer.

Another method and apparatus for reprocessing waste plastic material of which U.S. Pat. No. 3,192,293 is exemplary gathers two or more selvage plastic bands together to form an integrated strip of closely bunched selvage bands, and thereafter the strip is crimped along its length to form a unitary continuous corrugated ribbon. The plastic ribbon is then cut into a plurality of small segments of substantially the same size as standard new pellets used in the sheet molding apparatus.

Another method and apparatus used by the prior art has been to cool and solidify the plastic curtain-like extrudate into irregular sheets by quenching them in a trough of water and then passing them to an apparatus which crops the sheets, heats and re-extrudes the sheets in pellet form for reuse. A significant problem encountered with this method, however, has been the need to dry the pellets before reuse to drive off water entrapped during quenching. Another problem has been the difficulty of identifying and removing areas containing impurities. Still another problem in practice is the handling difficulty encountered when sections of the molten curtain weld together, overlap, or cool into irregular or corrugated masses.

Still another method used by the prior art has been to cool and solidify the curtain-like material by quenching the material in a trough of water, and then wrapping the resulting irregular sheets around a drum. The sheets are later unwound from the drums, slit into strands, heated, and chopped to form pellets. This method is cumbersome to operate and has the previously mentioned problems of driving off entrapped water and identifying and removing defects. Problems have also been encountered in wrapping sheets around a drum when the cooled sheets contain discontinuities, corrugations, irregularities, overlaps, or blobs of resin. It is also difficult to separate sheets of different color.

SUMMARY OF THE INVENTION

The problems encountered by the prior art have been overcome by the present invention which provides an improved method for reclaiming waste plastic extrudate of substantially uniform cross section generated during an extruding operation. The improved method of the present invention comprises gathering and twisting the extrudate after it leaves the extruder to form a plastic rope which is ready for reuse after passing through a quenching bath and pinch rollers. If desired, the rope is easily convertible, without the addition of heat, into pellets which can be reused. Since the forces required to twist the curtain into rope form are less than would be required for other forming methods such as re-extrusion, no additional heat input is required to achieve this shape, and therefore no further thermal degradation of the polymer can occur. Accordingly, the potential exists for producing a higher quality material for reuse than by many existing which require re-heating. Since the curtain is twisted into the shape of a rope before entering the quenching bath, a minimum amount of water is entrapped and the requirement to dry the rope or the pellets formed from the rope is greatly reduced. The presence of irregularities, overlaps or the like in the curtain does not significantly affect the final shape of the rope and creates no appreciable handling problems. Also, the plastic rope, before being converted into pellets, can be passed through an electric eye or magnetic detector or a similar sensing mechanism to identify impurities which are automatically removed before or during pelletizing.

The invention, and its features and advantages, will be set forth and become more apparent in the detailed description of the preferred embodiments presented below.

BRIEF DESCRIPTION OF THE DRAWINGS

In the detailed description of the preferred embodiments of the invention presented below, reference is made to the accompanying drawings in which:

FIG. 2 is a perspective view of a modified embodiment of the funnel of FIG. 1;

FIG. 3 is a top plan view of the roller funnel of FIG. 2;

FIG. 4 is a schematic plan view illustrating the position of the axes of the rollers relative to the funnel opening of FIG. 2;

FIG. 5 is a side elevational view in perspective and partially in section, on a reduced scale, showing belts in combination with the funnel for moving the material toward the funnel outlet; and FIG. 6 is a segmental view illustrating a modification of the belts of FIG. 5.

DESCRIPTION OF THE PREFERRED EMBODIMENTS

Figure 1:
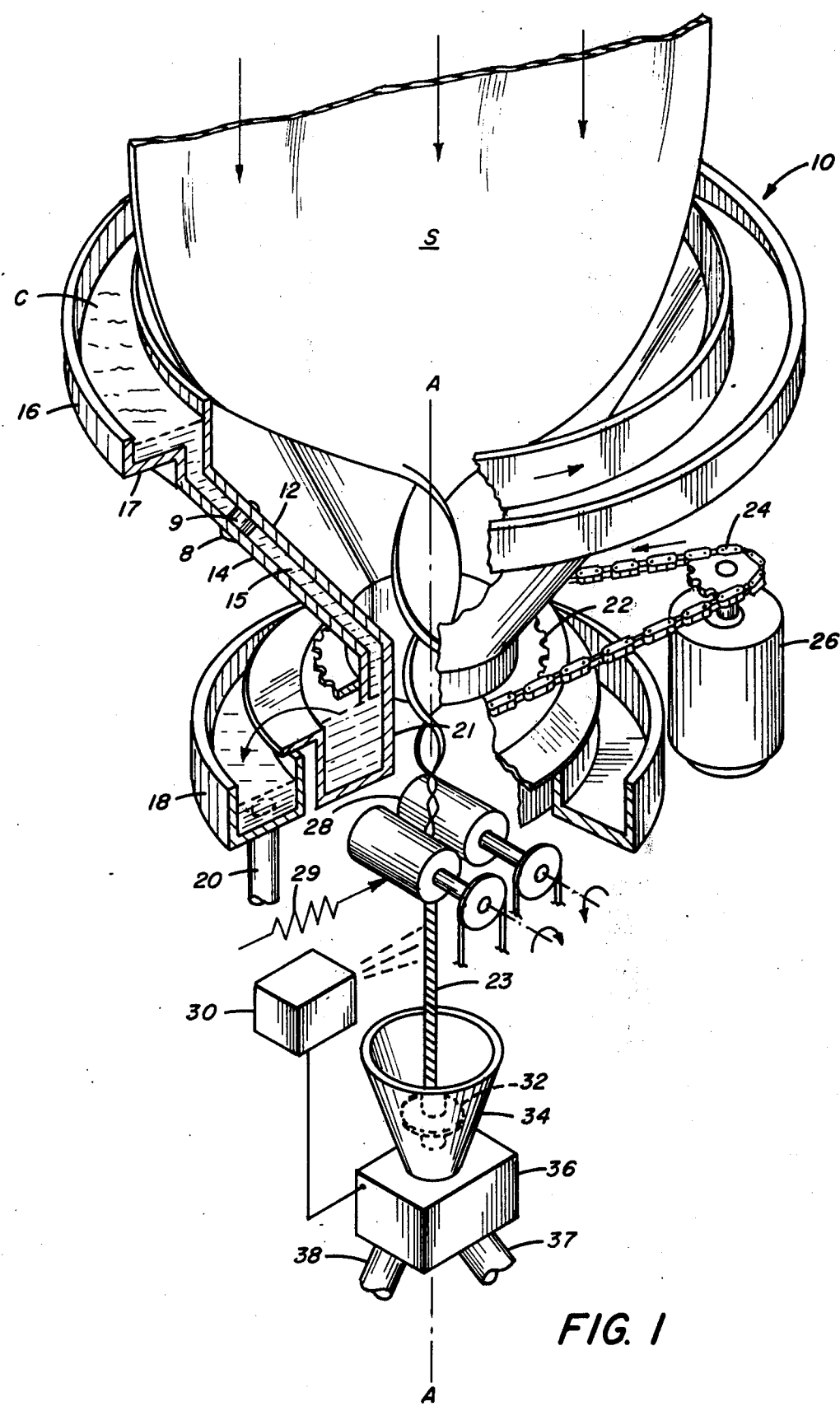
FIG. 1 is a side elevational view in perspective and partially in section illustrating one embodiment of the present invention while operating.

Because apparatus for reclaiming waste plastic is well known, the present description will be directed in particular to elements forming part of, or cooperating more directly with, the present invention. Elements not specifically shown or described herein should be understood to be selectable from those known in the art.

The embodiment shown in FIG. 1 is comprised of a rotatable funnel 10 having an inner wall 12 with an outer wall 14 affixed thereto and spaced apart therefrom by any suitable means such as bolts 8 extending through annular spacers 9. The walls 12, 14 form a passageway 15 for a coolant C passing between the two walls 12 and 14. The top of outer wall 14 is flared to form a lip 16 which defines a reservoir or trough 17 to hold coolant C. A second trough 18, connected to a drain 20, is provided to collect the coolant C after its passage through passageway 15. The coolant C may be recirculated by a pump and suitable tubing, not shown, back to trough 17. In the alternative, the coolant C may pass to an exhaust sump through drain 20, and means provided for continuously feeding fresh coolant at any desired rate to trough 17. Instead of or in addition to passing coolant C between the walls 12 and 14 of funnel 10, to mouth 21 of funnel 10 may be immersed in a coolant bath, or a coolant bath provided at the outlet of funnel 10 through which plastic material exuding from funnel mouth 21 can pass, or a vaporizing coolant such as Freon can be injected directly into the lower part of the funnel 12 in contact with the partially formed plastic rope described hereinafter. A sprocket 22, attached to the bottom of outer wall 14 in the vicinity of mouth 21 of funnel 10, is operatively associated with a chain or belt drive 24 driven by a variable-speed motor 26 for rotating funnel 10 about a vertical axis designated A—A in FIG. 1.

Below mouth 21 of funnel 10, at least one pair of pinch rollers 28 is provided to pull or draw the twisted sheet S through funnel 10 in the form of a plastic rope 23. Pinch rollers 28 are biased together by any suitable means such as a spring 29 illustrated schematically, or the like. Pinch rollers 28 are driven by means of a variable speed motor, not shown, such that their speed of rotation can be adjusted to different rates of output of waste plastic sheet from the extruder. After passing through pinch rollers 28, the twisted rope 23 is chopped into plastic pellets by any suitable chopping blade 32 mounted in a funnel 34. The pellets, which are in an easily reusable form, are carried away from the chopping blade 32 and funnel 34 by a tube 37 connecting funnel 34 to a vacuum source, not shown. When it is desired to identify and remove pellets containing defects from rope 23, one or more defect detectors 30 are positioned between the pinch rollers 28 and chopping blade 32. When defects such as magnetic particles, other foreign materials, or color variations are detected in rope 23, the detector 30 signals a deflection control device 36 for funnel 34 to deflect pellets containing the defects into a tube 38.

In operation, as shown in FIG. 1, an irregular sheet S of hot plastic material enters the top of funnel 10. The edges of sheet S contact the rotating inner surface of wall 12 of funnel 10 and adhere momentarily thereto thereby twisting plastic sheet S about its longitudinal axis coinciding with funnel axis A—A into the shape of a rope. The combination of the rotary rope-forming motion of funnel 10 and the loss of adhesion as the sheet S cools allows the twisted plastic sheet or rope to be pulled away continuously from the inner surface of wall 12 and drawn through funnel 10 by pinch rollers 28. As the plastic rope passes through one or more pairs of pinch rollers 28, it can be stretched if desired, and the rate of speed of the rollers 28 may be varied to control the diameter of the stretched plastic rope. The rotational speed of the funnel has to be empirically determined and depends upon many factors such as heat of the material, thickness of the extruded material, strength characteristics of the material, and material output rate of speed from the extruder.

If difficulty is experienced starting the plastic rope through pinch rollers 28, strips of material, such as solidified plastic or pieces of previously formed rope, are fed into the funnel 10. One portion of the feed material contacts and adheres to the hot sheet S while the lead end thereof is fed between pinch rollers 28. As the feed material passes through pinch rollers 28, it pulls the newly formed plastic rope 23 with it into engagement with pinch rollers 28.

After passing through the last pair of pinch rollers 28, the plastic rope passes the defect detector 30 and is pelletized by chopping blade 32. Defective pellets are diverted into tube 38 with the remaining pellets being carried away through tube 34. Alternatively, after passing through the last pair of pinch rollers 28, the plastic rope may be fed by a series of rollers (not shown) to a plastics processing machine (not shown) for immediate reuse. Alternatively, the rope may be spooled on a spooling device (not shown) for later processing.

Referring now to FIGS. 2–4, an alternative embodiment of the funnel 10 is shown. A plurality of rotating rollers 40, preferably cone-shaped, are disposed around a common vertical axis A—A forming a funnel-shaped opening with the axis of rotation 39 of each roller 40 skew to the common axis A—A, and the apex or small end of each roller 40 pointing in a downward direction. The apex of each of the rollers 40 is substantially tangential to an opening 44 through which the plastic rope is fed as illustrated schematically in FIG. 4. The rollers 40 are placed sufficiently close together so that the rising side of one roller brushes against any material adhering to the falling side of the adjacent roller, thereby loosening and cleaning the material from the latter roller. Alternatively, a scraping blade may be operatively associated with each of the rollers 40, particularly if the rollers are spaced apart, to prevent material from adhering to the rollers 40. The rollers 40 may be cooled if required by coolant passing into the interior of each roller 40 or by other suitable means similar to those previously described for the embodiment shown in FIG. 1.

In operation, all of the rollers 40 are caused to rotate in the same direction by any suitable means, not shown. Simultaneously, the entire assembly of rollers is mounted in any suitable cage which is rotatably driven by any suitable means around vertical axis A—A. The hot plastic sheet S to be reclaimed enters the top of the funnel-shaped opening formed by the rotating rollers 40 and comes in contact with the rollers 40 whose constant rotating action about their own axis and around vertical axis A—A has the effect of preventing the sheet S from sticking, tumbling the molten sheet and turning up the edge of the sheet to speed up formation of the sheet into a rope and conveying it toward opening 44. After passing through opening 44, the plastic rope is cooled and engaged by pinch rollers 28. Subsequent handling of the plastic rope is as described with respect to the embodiment of FIG. 1.

With reference to FIG. 5, instead of feeding strips of material into a funnel 10' to start the plastic rope through pinch rollers 28, one or more endless belts 48 may be located around the wall 12' of funnel 10'. The belts 48 are preferably smooth or of the type having spaced ribs 50 on the outer surface thereof, such as timing belts. The belts 48 may encircle the entire wall as in FIG. 5, or may encircle the lower portion of the wall by passing over a roller mounted in an opening adjacent the top.

The funnel 10' may be double-walled like funnel 10 or single-walled as shown. Cooling of the hot plastic material may be accomplished by introducing a coolant between the walls of a double-walled funnel 10', cooling the endless belts 48, immersing a portion of the funnel 10' in a cooling bath, providing a cooling trough or station between the funnel mouth and pinch rollers, introducing a coolant directly into the funnel below the point at which the rope has substantially been formed, or any other of the methods well known to the art. The endless belts 48 are trained over rollers, all of which rotate with funnel 10' as a unit around axis A—A.

In operation, a sheet of hot plastic material enters the top of funnel 10'. The edges of the sheet contact the rotating inner surface of wall 12' and adhere momentarily thereto thereby twisting the sheet about its longitudinal axis into the shape of a rope. As the funnel 10' continues to rotate, the plastic rope comes into contact with the slowly moving belts 48 and is carried downward into engagement with pinch rollers 28. Subsequent handling of the plastic rope is as described with respect to the embodiment of FIG. 1.

The invention has been described in detail with particular reference to preferred embodiments thereof, but it will be understood that variations and modifications can be effected within the spirit and scope of the invention.

I claim:

1. A method for reclaiming a sheet of hot extruded plastic material comprising the steps of:
   directing the hot material into the large end of a vertically oriented rotating, funnel-shaped device which engages the material and twists it about a longitudinal axis into a rope-like shape;
   the material momentarily adhering to the walls of the device when engaged thereby drawing the material to and through the small end of said funnel-shaped device; and
   concurrently cooling the material as it passes through said device.

2. A method according to claim 1 wherein said cooling step includes directing a coolant into a space located within the walls of said funnel-shaped device.

3. A method according to claim 1 wherein said cooling step includes immersing at least a portion of said funnel-shaped device in a coolant.

4. A method according to claim 1 wherein said cooling step includes directing a coolant into the funnel itself in direct contact with the partially-formed plastic rope.

5. A method according to claim 1 further comprising the step of passing said rope-like shape material through at least one pair of rotating pinch rollers.

6. A method according to claim 5 further comprising the step of chopping said rope-like shape material into pellets.

7. A method according to claim 6 further comprising the step of identifying and removing pellets containing defects.

8. A method of reclaiming a hot extruded sheet of plastic material comprising the steps of:
   feeding the hot extruded sheet into the large end of a vertically oriented funnel-shaped device;
   cooling the walls of said device during said feeding step so that said sheet momentarily adheres to said walls when said sheet comes into contact therewith;
   rotating said device during said feeding step so that the adhered sheet is twisted into a rope-like shape during the feeding thereof; and
   removing the rope-like shape from said device through the small end thereof.

9. A method according to claim 8 wherein said removing step includes:
   contacting the material with a belt whose movement assists in removing the material from said device.

10. A method of reclaiming a hot extruded sheet of plastic material comprising the steps of:
    combining a plurality of rotating rollers around a common axis to form a funnel-shaped device;
    directing the hot material into the large end of said funnel-shaped device;
    contacting said device with portions of the material so that the material momentarily adheres to said device and is twisted;
    cooling the material as it passes through said device; and
    removing said twisted material from said device through the small end thereof.

11. A method according to claim 10 wherein said cooling step includes cooling said rotating rollers.

* * * * *